United States Patent
Lee et al.

(10) Patent No.: US 7,387,421 B2
(45) Date of Patent: Jun. 17, 2008

(54) SURFACE LIGHT SOURCE AND BACKLIGHT UNIT HAVING THE SAME

(75) Inventors: Hyun Ho Lee, Kyungki-do (KR); Jae Wook Kwon, Seoul (KR); Hyeong Won Yun, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/483,732

(22) Filed: Jul. 11, 2006

(65) Prior Publication Data

US 2007/0008740 A1    Jan. 11, 2007

(30) Foreign Application Priority Data

Jul. 11, 2005    (KR) .................. 10-2005-0062297

(51) Int. Cl.
*F21V 7/04*    (2006.01)
(52) U.S. Cl. .................. 362/612; 362/613; 362/249; 362/231; 362/555; 362/252
(58) Field of Classification Search ............... 362/612, 362/249, 231, 555, 252
See application file for complete search history.

(56) References Cited

U.S. PATENT DOCUMENTS

| | | | |
|---|---|---|---|
| 4,500,914 A * | 2/1985 | Watanabe et al. ........... 348/280 |
| 5,956,086 A * | 9/1999 | Sawanobori ................. 348/273 |
| 6,326,981 B1 * | 12/2001 | Mori et al. .................. 345/695 |
| 6,923,548 B2 * | 8/2005 | Lim ........................... 362/612 |
| 7,220,039 B2 * | 5/2007 | Ahn et al. ................... 362/612 |
| 2002/0024491 A1 * | 2/2002 | Hosoyamada ................ 345/88 |
| 2007/0103054 A1 * | 5/2007 | Chng et al. .................. 313/498 |

* cited by examiner

*Primary Examiner*—Ali Alavi
*Assistant Examiner*—Evan Dzierzynski
(74) *Attorney, Agent, or Firm*—McDermott Will & Emery LLP

(57) ABSTRACT

A backlight unit for a liquid crystal display is provided. The backlight unit includes a surface light source, a diffuser sheet uniformly diffusing incident light from the surface light source, and a light collection sheet collecting light diffused by the diffuser sheet. The surface light source includes a first LED arrangement in which two green LEDs, a red Led, and a blue LED are arranged in this order and a second LED arrangement in which two green LEDs, a blue LED, and a red LED are arranged in this order. The first and second LED arrangements are done along rows or columns, and, in a combination of the first and second LED arrangement, the two green LEDs are surrounded by the red and/or blue LEDs.

4 Claims, 8 Drawing Sheets

SURFACE LIGHT SOURCE AND BACKLIGHT UNIT HAVING THE SAME

RELATED APPLICATION

The present application is based on, and claims priority from, Korean Patent Application Number 2005-62297, filed on Jul. 11, 2005, the disclosure of which is hereby incorporated by reference herein in its entirety.

BACKGROUND OF THE INVENTION

1. Field of the Invention

The present invention relates to a surface light source using light emitting diodes (LEDs) and having improved light emission quality and a backlight unit for a liquid crystal display (LCD) having the surface light source, and more particularly, to a surface light source that can provide uniform white light by eliminating color stain phenomenon by arranging LEDs such that two adjacent green LEDs can be surrounded by red and/or blue LEDs.

2. Description of the Related Art

A cold cathode fluorescent lamp (CCFL) is widely used as a light source of a conventional backlight for an LCD. Since the CCFL uses mercury gas, it may cause the environmental pollution. Furthermore, the CCFL has a relatively slow response time and a relatively low color reproduction. In addition, the CCFL is not proper to reduce the weight, thickness and overall volume of an LCD panel to which it is applied.

However, LEDs are eco-oriented and have a response time of several nano seconds, thereby being effect for a video signal stream and enabling an impulsive driving. Furthermore, the LEDs have 100% color reproduction and can properly vary luminance and color temperature by adjusting a quantity of light emitted from red, green and blue LEDs. In addition, the LEDs are proper to reduce the weight, thickness and overall volume of the LCD panel. Therefore, in recent years, they have been widely used as a light source of a backlight unit for the LCD.

The LCD backlight employing the LEDs can be classified into an edge type backlight and a direct type backlight according to positions of the light source. In the edge type backlight, the light source is positioned at a side and emits light toward a front surface of the LCD panel using a light guide plate. In the direct type backlight, the light source is a surface light source placed under the LCD panel and having a surface area almost identical to that of the LCD panel and directly emits light toward the front surface of the LCD panel.

In order to generate white light by mixing red, green and blue colors, as shown in FIG. 1B, a convention direct type LCD panel uses a surface light source 300 having a plurality of 2×2 LED matrixes 305 that are arranged along rows and columns. As shown in FIG. 1A, each of the 2×2 LED matrixes 305 includes red and blue LEDs arranged in a first diagonal direction and two green LEDs arranged in a second diagonal direction.

In FIGS. 1A and 1B, reference symbols "R," "G" and "B" represent the red LED, the green LED, and the blue LED, respectively. Generally, in order to generate the white light, two green LEDs, one red LED and one blue LED are used.

Referring to FIG. 1B, the red light, the green light and the blue light are effectively mixed with each other at a central portion of the surface light source 300, thereby uniformly generating the white light. However, since the blue or red LEDs cannot be properly arranged at edge portions 311 and 312, red color light or blue color light is emitted from the edge portions 311 and 312.

That is, only the red LEDs (R) and the green LEDs (G) are alternately arranged at the edge portion 311, but no blue LED (B) is arranged at the edge portion 311. Also, the red color light is emitted from the edge portion 311. Only the blue LEDs (B) and the green LEDs (G) are alternately arranged at the edge portion 312, but no red LED (R) is arranged at the edge portion 312. Also, the blue color light is emitted from the edge portion 312.

That is, the surface light source 300 using the above-described LED arrangement cannot uniformly emit the white light at the edge portions 311 and 312 thereof.

FIG. 2 is a schematic view of a conventional surface light source for solving the above-described problems. According to this conventional surface light source 400, blue, green, green, and red LEDs are repeatedly arranged in this order along a first row 410. Also, green, red, blue, and green LEDs are repeatedly arranged in this order along a second row 420, and green, blue, red, and green LEDs are repeatedly arranged in this order along a third row 430. In addition, red, green, green, and blue LEDs are repeatedly arranged in this order along a fourth row.

In the conventional surface light source 400, since the green, red, blue, and green LEDs are provided at edge portions 411 and 412, uniform white light can be emitted from the edge portions 411 and 412. However, since there is a region 415 where four green LEDs are consecutively arranged at a central portion of the surface light source 400, green color light is emitted from the region 415. This causes the color stain of the LCD panel.

An optical simulation was performed for the conventional surface light source 400. As a result, it can be noted that the conventional light source has a color coordinate distribution 450 as shown in FIG. 3. The color coordinate distribution 450 shows that a green color is strongly distributed as compared with a normal color distribution illustrated in FIG. 6 and a color resolution of a human being illustrated in FIG. 7. That is, referring to the color coordinate distribution 450, it can be noted that X-axis value is inversely proportional to Y-axis value. That is, the distribution of Y-axis is low when the distribution of an X-axis is high, or the distribution of Y-axis is high when the distribution of X-axis is low. When comparing this distribution with a normal color distribution illustrated in FIG. 6, the green color distribution is higher than that in FIG. 6. The color distribution strays off from a region (i.e., an oval region 462) that is similar to the color detection level of the human being. That is, the color distribution is included in the outer oval region 464 such that the human being recognizes other colors rather than the white light.

Therefore, the conventional surface light source 400 and the backlight unit using the conventional surface light source 400 cannot provide a uniform white light distribution due to the color stain.

SUMMARY OF THE INVENTION

Accordingly, the present invention is directed to an LED surface light source and an LCD backlight unit having the LED surface light source that substantially obviate one or more problems due to limitations and disadvantages of the related art.

An object of the present invention is to provide an LED surface light source that can generate uniform white light at edge portions thereof by properly arranging red, green and blue LEDs and an LCD backlight unit having the LED surface light source.

Another object of the present invention is to provide an LED light source that can generate white light similar to a color detection level of a human being so that less color stain appears and an LCD backlight unit having the LED light source.

Still another object of the present invention is to provide that can generate uniform white light by arranging a white light region in a diagonal direction of the X and Y-axes of a color coordinate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a surface light source including: a first LED arrangement in which two green LEDs, a red Led, and a blue LED are arranged in this order; and a second LED arrangement in which two green LEDs, a blue LED, and a red LED are arranged in this order, wherein the first and second LED arrangements are done along rows or columns, and, in a combination of the first and second LED arrangement, the two green LEDs are surrounded by the red and/or blue LEDs.

The surface light source may further include additional first LED arrangements and additional second LED arrangements, wherein the first LED arrangements are paired and the second LED arrangements are paired, pairs of the first LED arrangements and pairs of the second LED arrangements are alternately arranged with each other.

The first LED arrangement may be offset with respect to the second LED arrangement such that the two green LEDs of the first LED arrangement do not overlap the two green LEDs of the second LED arrangement.

According to another aspect of the present invention, there is provided a backlight unit for a liquid crystal display, including: a surface light source including a first LED arrangement in which two green LEDs, a red Led, and a blue LED are arranged in this order and a second LED arrangement in which two green LEDs, a blue LED, and a red LED are arranged in this order, wherein the first and second LED arrangements are done along rows or columns, and, in a combination of the first and second LED arrangement, the two green LEDs are surrounded by the red and/or blue LEDs; a diffuser sheet uniformly diffusing incident light from the surface light source; and a light collection sheet collecting light diffused by the diffuser sheet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1A:
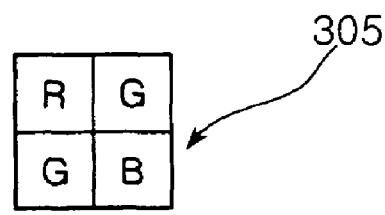
FIG. 1A is a schematic view of an arrangement of an LED matrix used in a conventional surface light source.
Figure 1B:
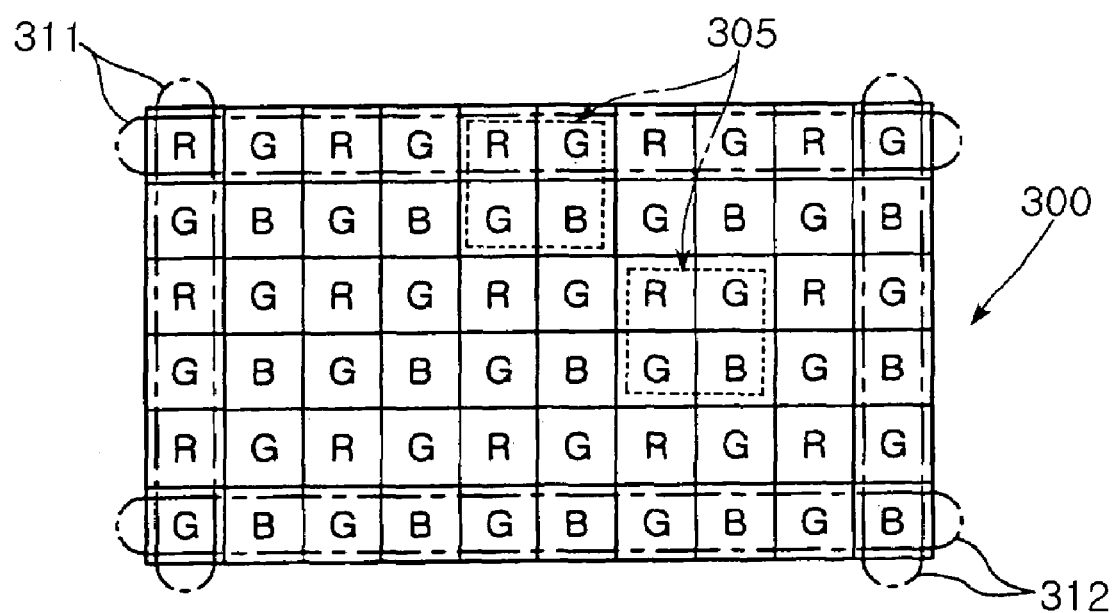
FIG. 1B is a schematic view of a surface light source employing the LED matrixes of FIG. 1A.
Figure 2:
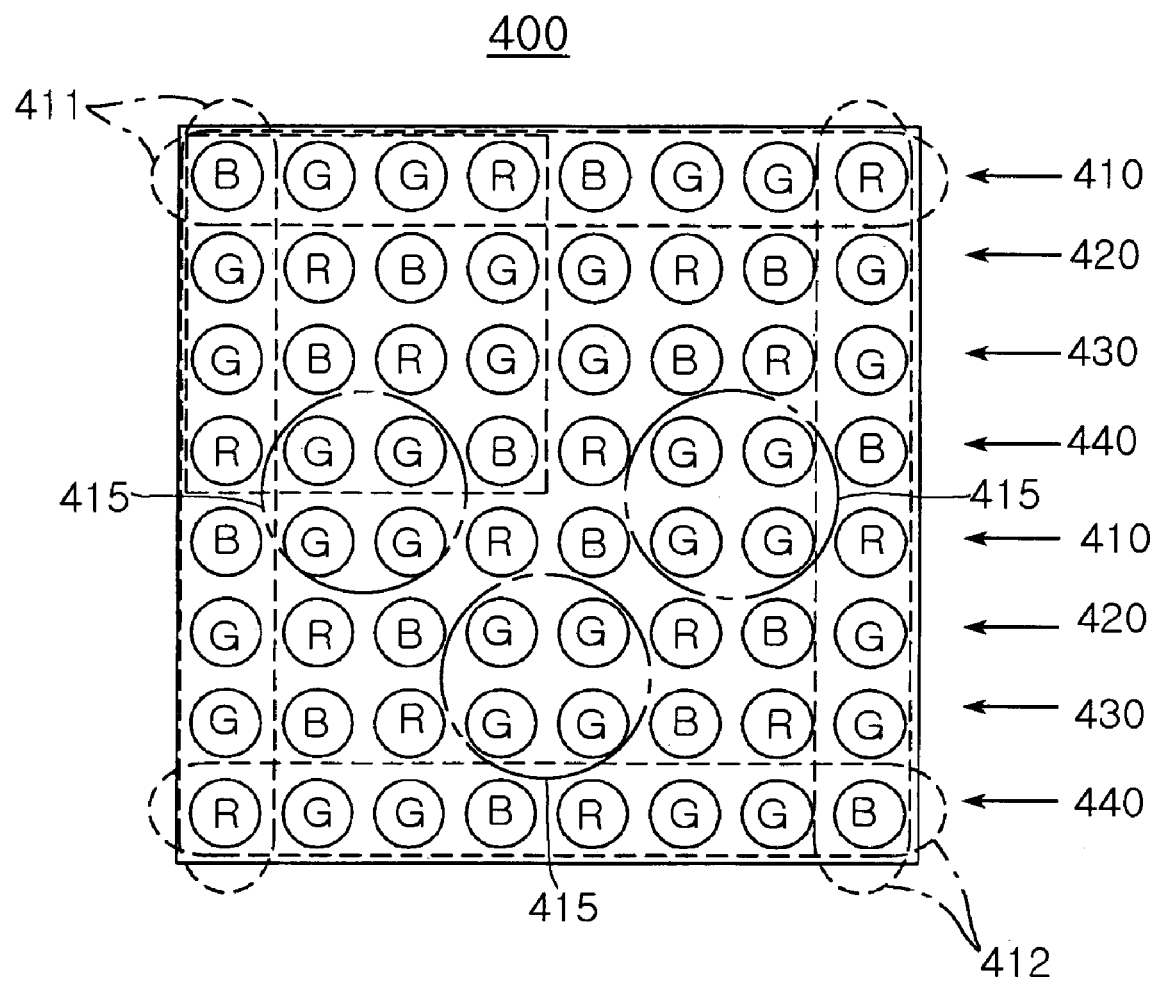
FIG. 2 is a view of another conventional surface light source.
Figure 3:
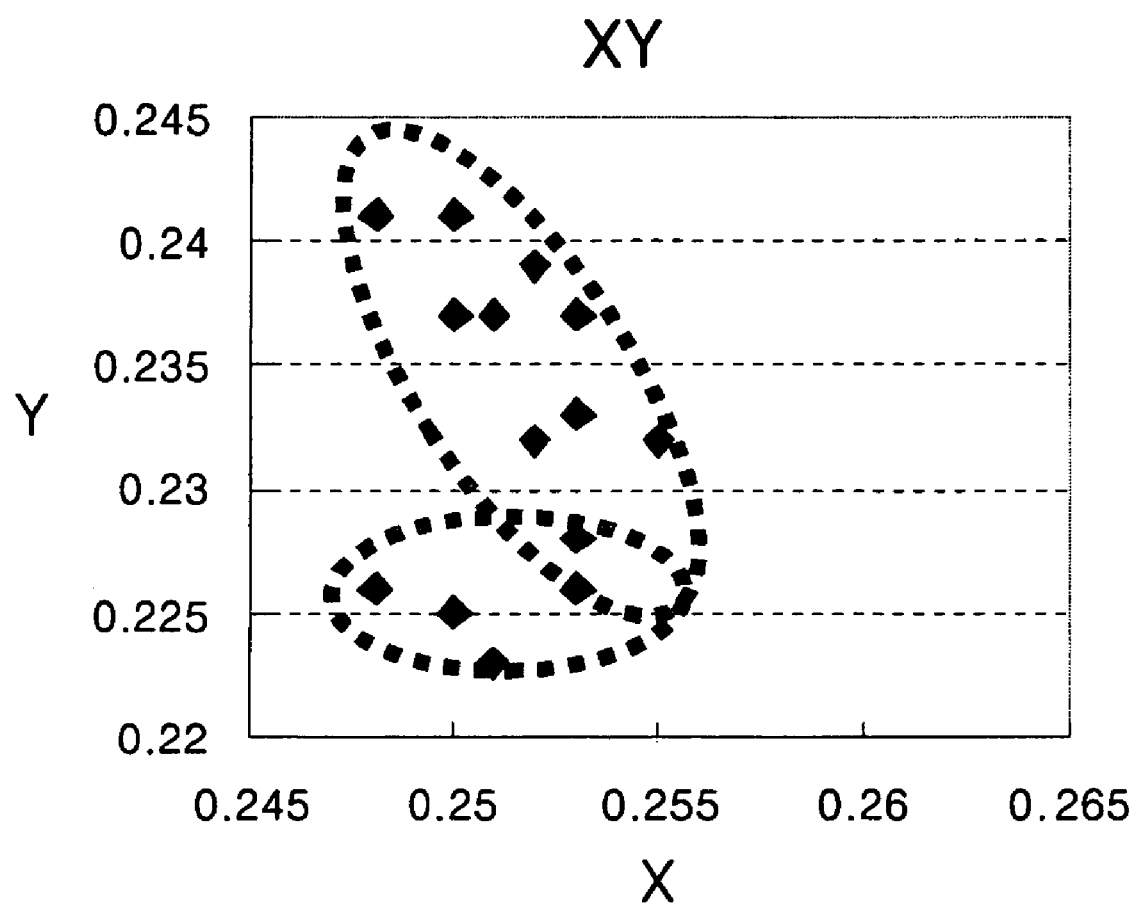
FIG. 3 is a graph of a color coordinate distribution obtained through a simulation of the conventional surface light source of FIG. 2.
Figure 4:
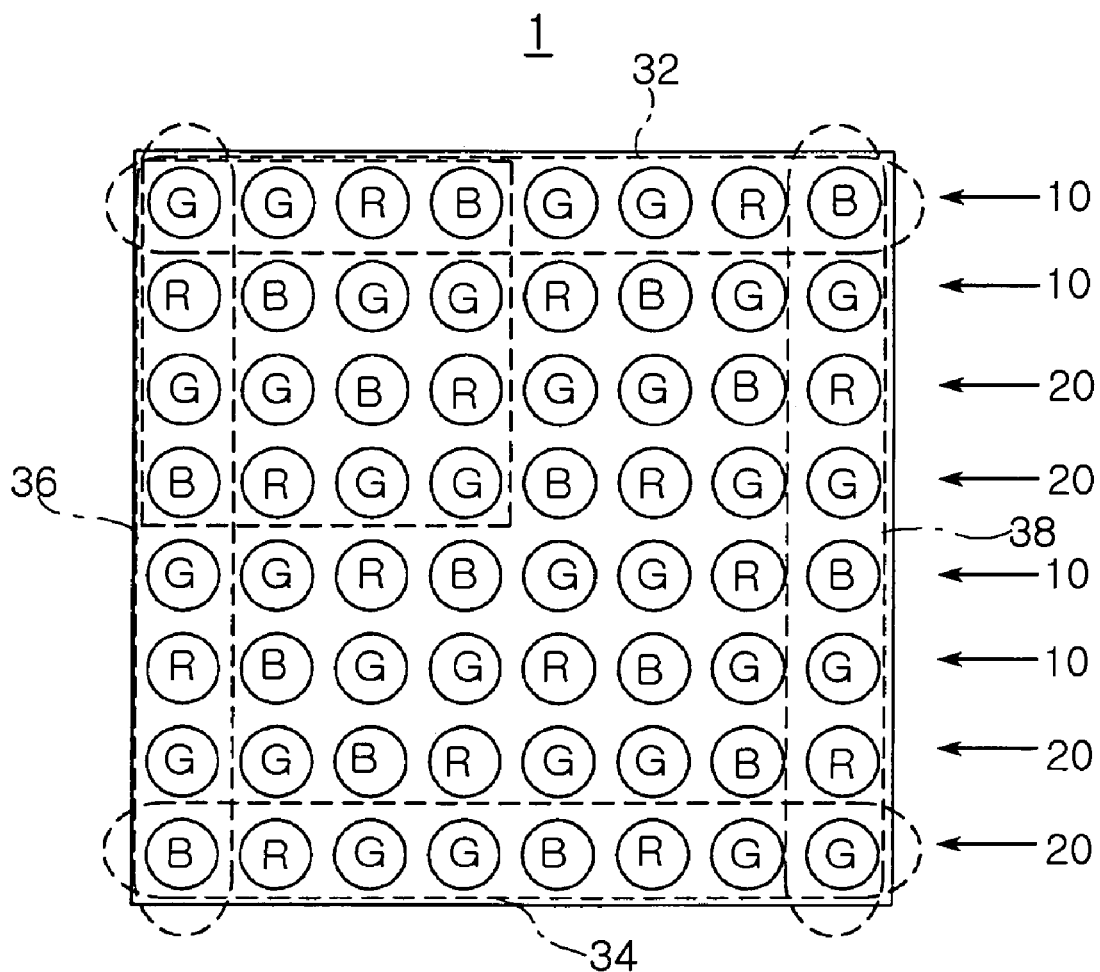
FIG. 4 is a view of a surface light source according to an embodiment of the present invention.

Referring to FIG. 4, a surface light source 1 according to an embodiment of the present invention includes red (R), green (G) and blue (B) LEDs arranged along rows and columns.

In FIG. 4, reference symbols R, G and B represent red LED, green LED, and blue LED, respectively. In the following description, the red, green and blue LEDs mean LEDs emitting red, green and blue lights, respectively.

The surface light source 1 of the present embodiment includes first LED arrangements 10 where green G, green G, red R, and blue B LEDs are repeatedly arranged in this order. In FIG. 4, first, third, fifth and seventh rows have the first LED arrangements 10.

The surface light source 1 further includes second LED arrangements 20 where green R, green R, blue B, and red R LEDs are repeatedly arranged in this order. In FIG. 4, third, fourth, seventh, and eighth rows have the second LED arrangements 20.

Furthermore, in the surface light source 1 of the present invention, the first and second LED arrangements 10 and 20 are realized along rows and columns such that two green LEDs are surrounded by red or blue LEDs, Although the first and second LED arrangements are formed along rows in FIG. 4, the present invention is not limited thereto. That is, the first and second LED arrangements may be formed along either columns or rows.

For the first LED arrangement in FIG. 4, the blue, green, green, red LEDs are repeatedly arranged in this order. That is, the color arrangement of the LEDs is as follows: . . . green-green-red-blue-green-green-red-blue-green-green-red-blue-green . . . .

The first LED arrangement 10 of the second row is offset with respect to the first LED arrangement 10 of the first row by two LEDs. That is, the two green LEDs of the first row do not overlap the two green LEDs of the second row.

That is, the color arrangement of the second row is as follows: . . . -red-blue-green-green-red-blue-green-green-red-blue-green-green-red- . . . .

In addition, the first LED arrangement 10 is identically applied to the fifth and sixth rows. That is, the first LED arrangements 10 of the first and second rows are identically repeated at the fifth and sixth rows.

Meanwhile, the second LED arrangements 20 of the third, fourth, seventh, and eighth rows are similar to the above-described arrangement.

That is, as shown in FIG. 4, for the second LED arrangements 20, the red R, green G, green G, and blue LEDs are repeatedly arranged in this order. The color arrangement of the third row is as follows: . . . -green-green-blue-red-green-green-blue-red-green-green-blue-red-green- . . . .

The second LED arrangement 20 of the fourth row is offset with respect to the second LED arrangement 10 of the third rows by two LEDs. That is, the two green LEDs of the third row do not overlap the two green LEDs of the fourth row.

Therefore, the color arrangement of the fourth row having the second LED arrangement 20 is as follows: . . . -blue-red-green-green-blue-red-green-green-blue-red-green-blue- . . . .

In addition, the second LED arrangements 20 can be identically applied to the seventh and eighth rows. That is, the second LED arrangements 20 of the third and fourth rows are identically repeated at the seventh and eighth rows.

As described above, pairs of the first LED arrangements 10 and pairs of the second LED arrangements are alternately arranged.

Furthermore, for the two adjacent first LED arrangements 10, the green LEDs of one of the first LED arrangements 10 does not overlap the green LEDs of the other of the first LED arrangements.

Therefore, the surface light source 1 of the present invention having the first and second LED arrangements 10 and 20 that are formed along the rows or columns includes a plurality of regions where two adjacent green LEDs are surrounded by the red and/or blue LEDs.

Although an 8×8 matrix structure is exemplarily shown in FIG. 4, the present invention is not limited this structure. That is, the number of LEDs may be changed.

By the first and second LED arrangements 10 and 20 along the rows, the LED arrangements along the columns are also uniformly realized. Therefore, uniform white light can be emitted even from the edge portions of the surface light source 1.

That is, since the horizontal edge portions 32 and 34 of the surface light source 1 have the first or second LED arrangement 10 and 20 where the red R, blue B, green G, and green G LEDs are repeatedly arranged in this order, the horizontal edge portions 32 and 34 can emit uniform white light. In addition, since the vertical edge portions 36 and 38 of the surface light source 1 have the predetermined LED arrangement where the green G, blue B, green G, and red R LEDs are repeatedly arranged in this order, the vertical edge portions 36 and 38 can emit uniform white light. In addition, at a center portion of the surface light source 1, since the two green LEDs of a row do not overlap the two green LEDs of an adjacent row, the center portion can emit uniform white light.

Figure 6:
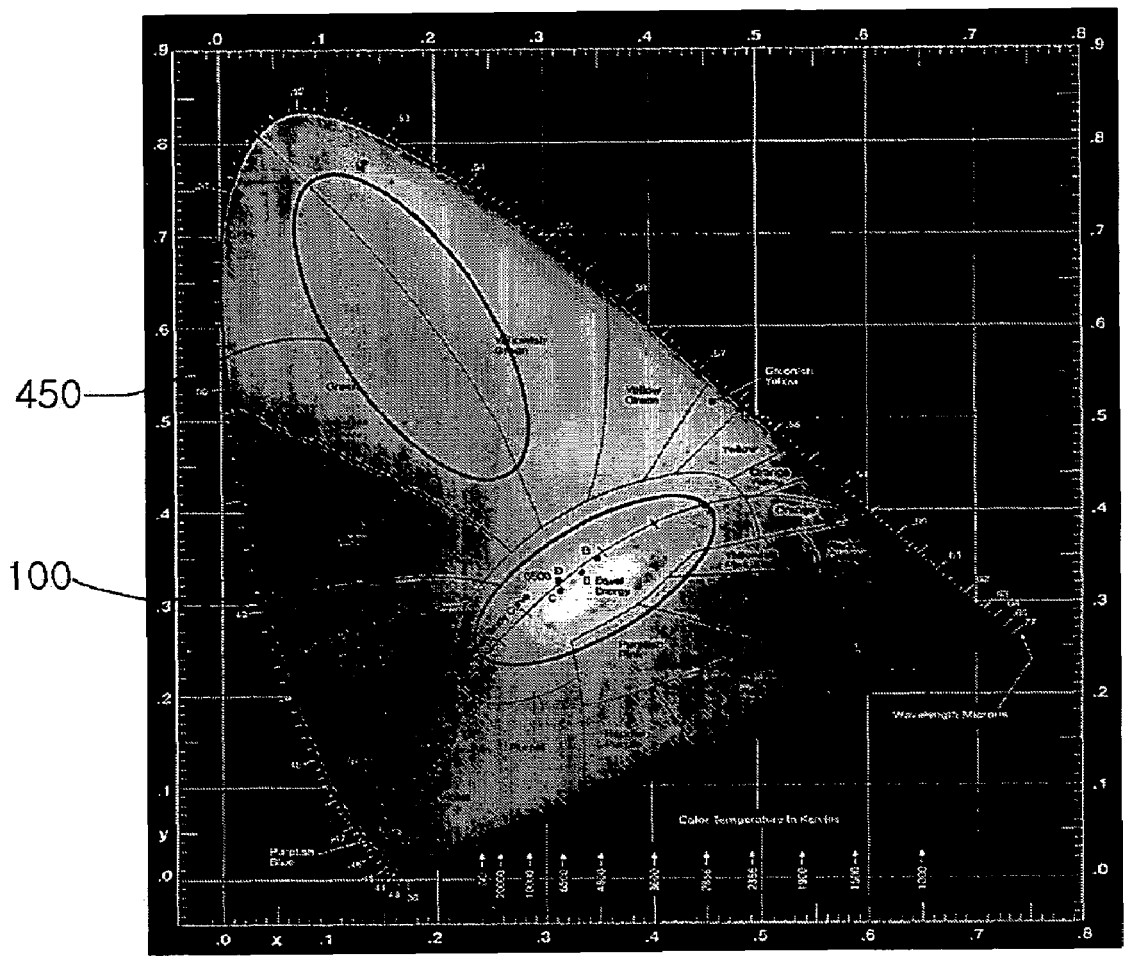
FIG. 6 is a graph of a color distribution according to a normal color coordinate.
Figure 7:
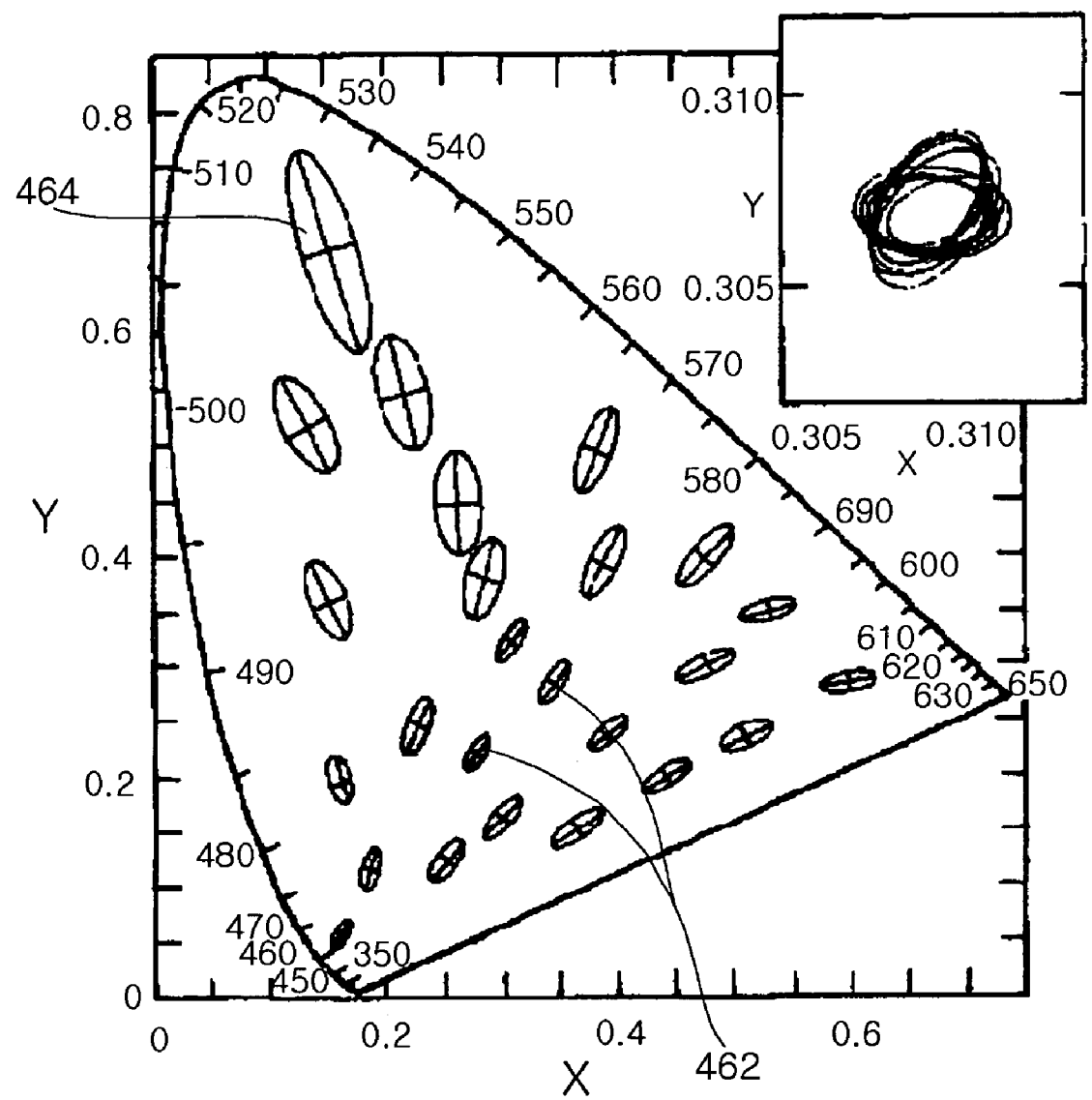
FIG. 7 is a graph illustrating a color resolution of a human being where each oval represents a region where the human being recognizes one color.

An optical simulation for the surface light source 1 was performed and a color coordinate distribution "100" was obtained from the optical simulation. The color coordinate distribution "100" corresponds to a portion where the white lights are placed as compared with the normal color distribution of FIG. 6 and a graph illustrating a color resolution of a human body. The color coordinated distribution "100" corresponds to a region 462 where a size of oval is small and the human being cannot sensitively feel the color distribution.

Figure 5:
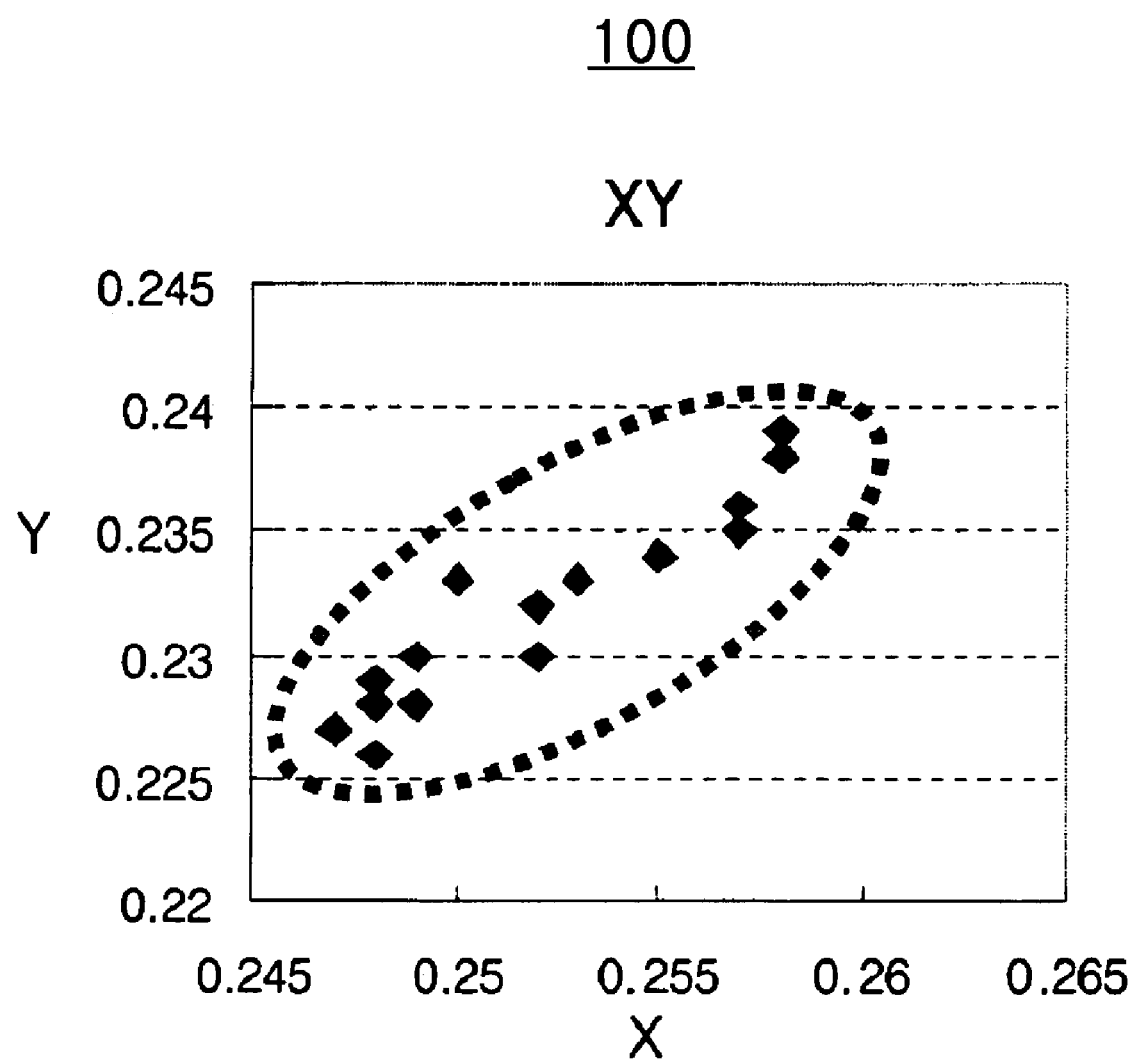
FIG. 5 is a graph of a color coordinate distribution obtained through a simulation of the surface light source of FIG. 4.

That is, as shown in FIG. 5, the color coordinate distribution "100" obtained through the simulation for the surface light source 1 of the present invention is in a diagonal direction where an X-axis is proportional to Y-axis. That is, if the X-axis is high, the Y-axis is also high, and if the X-axis is low, the Y-axis is also low. That is, the color coordinate distribution "100" obtained from the surface light source 1 of the present invention corresponds to the normal color distribution region 100 of FIG. 6 and is in a region similar to a color detection level by which the human being cannot easily feel, i.e., a small oval region 462 at a central portion. Thus, the human being cannot feel other colors other than white light.

Therefore, the surface light source 1 of the present invention eliminates the color stain to provide a uniform distribution of the white light.

The above-described surface light source 1 can be applied to an LCD backlight unit 200 emitting light toward a rear surface of the LCD panel.

Figure 8:
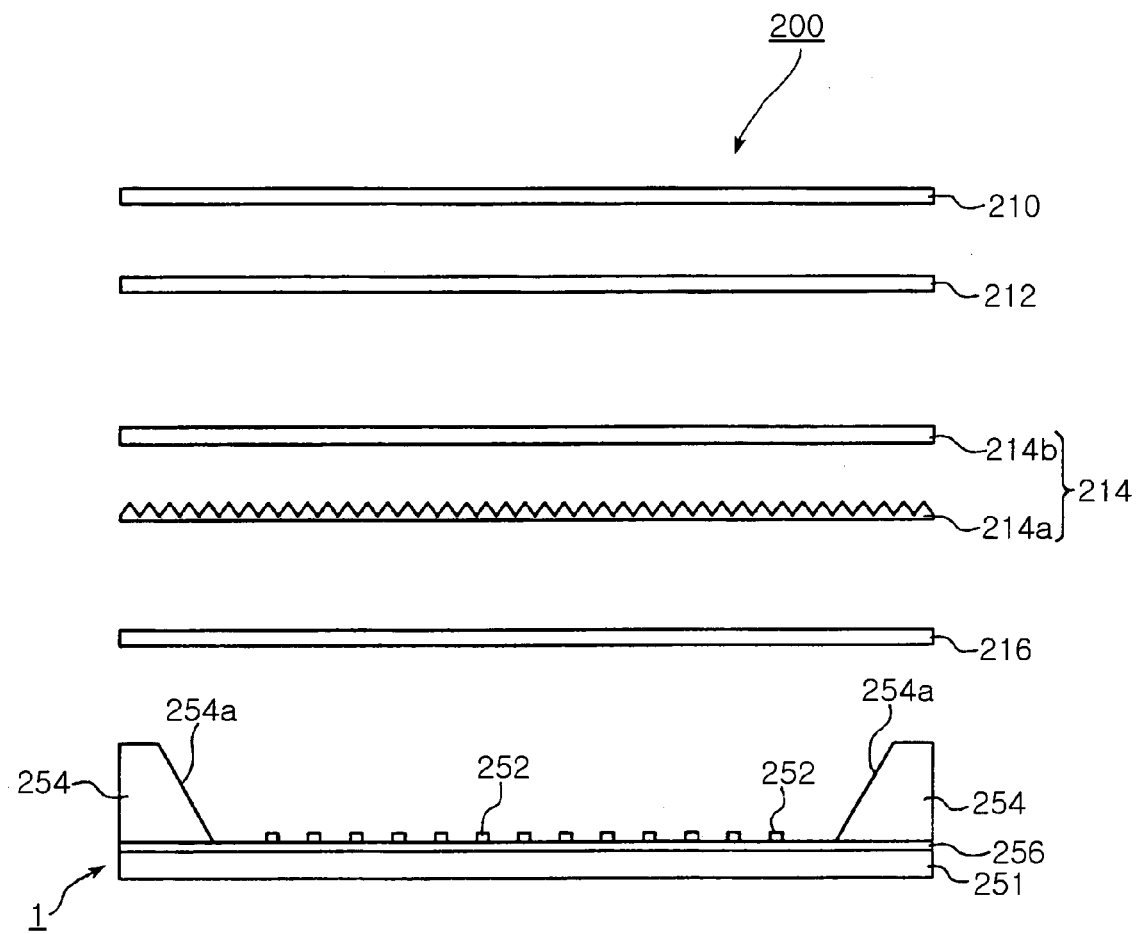
FIG. 8 is an exploded sectional view of an LCD backlight unit according to an embodiment of the present invention.

FIG. 8 is an exploded sectional view of an LCD backlight unit according to an embodiment of the present invention. As shown in FIG. 8, the LCD backlight unit 200 attached on a rear surface of the LCD panel includes the surface light source 1 and a diffuser sheet 216 provided at an LCD panel side of the surface light source 1 to uniformly diffuse incident light from the surface light source 1. At least one light collection sheet 214 (two light collection sheets 214a and 214b in FIG. 8) is provided at an LCD panel side of the diffuser sheet 216 to collect light diffused from the diffuser sheet 216 in a direction vertical to a plan of the LCD panel 210. A protective sheet 212 may be additionally disposed on the light collection sheet 214 to protect the optical structure.

In addition, the surface light source 1 further includes a substrate 251 and a plurality of LEDs 252 arranged in the above-described matrix structure according to the present invention. A sidewall 254 is formed on a top edge of the substrate 251 to surround the LEDs 252. The sidewall 254 has an inclined surface facing the LEDs 252. A reflection layer 256 may be formed on a top surface of the substrate 251 to reflect the light emitted from the LEDs 252 upward.

A reflection material 254a may be deposited on the inclined surface of the sidewall 254 to reflect the light emitted in a lateral direction upward.

The diffuser sheet 216 disposed above the surface light source 1 diffuses the incident light from the surface light source 1 to prevent the light from being locally concentrated. In addition, the diffuser sheet 216 controls a traveling direction of the light toward the first light collection sheet 214a to reduce the inclined angle to the first light collection sheet 214a.

The first and second light collection sheets 214a and 214b are provided at their top surfaces with a plurality of prisms arranged in a predetermined pattern. The prisms of the first light collection sheet 214a cross the prisms of the second light collection sheet 214a at a predetermined angle of about 90°. The first and second light collection sheets 214a and 214b function to collect the light diffused from the diffuser sheet 216 in a direction vertical to the plan of the LCD panel 210. Therefore, the light passing through the first and second light collection sheets 214a and 214b can incident on the protective sheet 212 in a direction normal to the surface of the protective sheet 212. As a result, since the light passing through the first and second light collection sheets 214a and 214b travels in a direction normal to the surface of the protective sheet 212, the luminance distribution on the protective sheet becomes uniform. In FIG. 8, although two light collection sheets are exampled, the present invention is not limited to this. That is, if required, only one light collection sheet can be provided.

The protective sheet 212 formed above the second light collection sheet 214b functions to not only protect the surface of the second light collection sheet 214b but also diffuse the light to make the light distribution uniform. The LCD panel 210 is disposed on the protective sheet 212.

The LCD backlight unit 200 using the surface light source 1 according to the present invention is a direct type backlight unit that directly emits light to an entire rear surface of the LCD panel. In this case, since the inventive surface light source 1 can uniformly emit white light even at the edge portions thereof while eliminating color stain, the LCD backlight unit can provide uniform white light. Therefore, the backlight unit of the present invention is proper to reduce weight and thickness of the LCD and enhances the display quality of the LCD as compared with a convention edge type backlight unit using a lateral light source.

According to the present invention, the inventive surface light source can provide uniform white light by eliminating color stain phenomenon by arranging LEDs such that two adjacent green LEDs can be surrounded by red or blue LEDs.

In addition, by making the white light emitted from the surface light source be similar to the cooler detection level of the human being, a uniform white light effect can be obtained.

Furthermore, the white light region is distributed in a diagonal direction of X and Y-axes of the color coordinate, the uniform white light can be obtained and thus the quality of the LCD backlight unit can be improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A surface light source having a plurality of red, green and blue light emitting diodes arranged in a matrix, the surface light source comprising:

a first light emitting diode array having repeated groups of adjacent two green light emitting diodes, one red light emitting diode and one blue light emitting diode arranged sequentially in that order; and a second light emitting diode array having repeated groups of adjacent two green light emitting diodes, one blue light emitting diode and one red light emitting diode arranged sequentially in that order, wherein the first and second light emitting diode arrays are arranged in a row or a column, and at least one of each of the blue light emitting diodes and the red light emitting diodes partially surround the adjacent green light emitting diodes of the first and second light emitting diode arrays.

2. The surface light source of claim 1, wherein the first and second light emitting diode arrays are formed as a pair, respectively, to be arranged alternately with each other.

3. The surface light source of claim 2, wherein the green light emitting diodes of the first light emitting diode array do not intersect the green light emitting diodes of the second light emitting diode array in the adjacent row or column.

4. A liquid crystal display backlight unit attached to a liquid crystal display panel, the liquid crystal display backlight unit comprising:

a surface light source comprising a first light emitting diode array having a continuously repeating pattern of adjacent two green light emitting diodes, a red light emitting diode and a blue light emitting diode arranged sequentially in that order, and a second light emitting diode array having a continuously repeating pattern of adjacent two green light emitting diodes, a blue light emitting diode and a red light emitting diode arranged sequentially in that order;

a diffuser sheet uniformly diffusing light incident from the surface light source; and a light collection sheet collecting light diffused by the diffuser sheet, wherein the first and second light emitting diode arrays are arranged in a row or a column, and at least one of each of the blue light emitting diodes and the red light emitting diodes partially surround the adjacent green light emitting diodes of the first and second light emitting diode arrays.

* * * * *